J. D. GALLAGHER.
BRAKE SHOE AND SUPPORTING MEANS THEREFOR.
APPLICATION FILED MAR. 24, 1913.
1,079,001.
Patented Nov. 18, 1913.
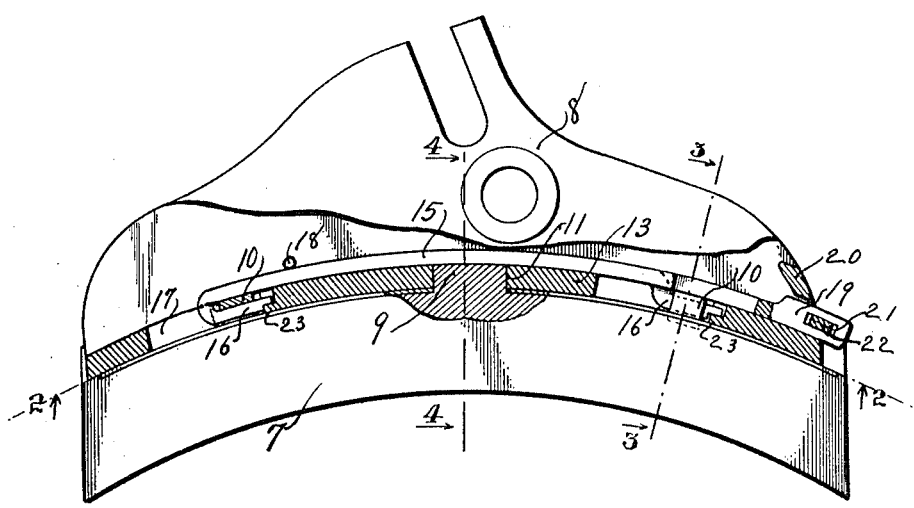
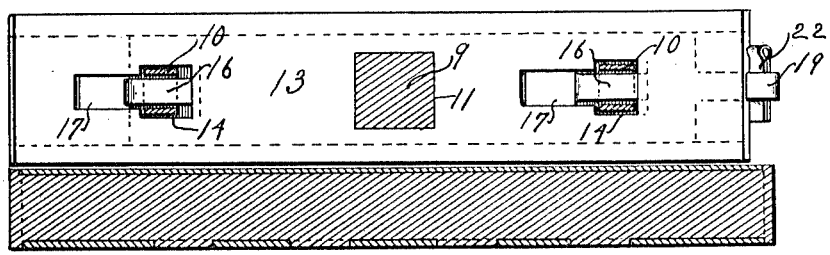
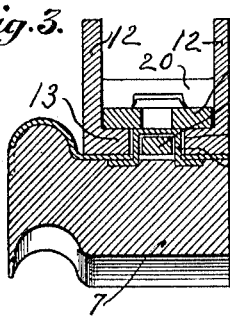
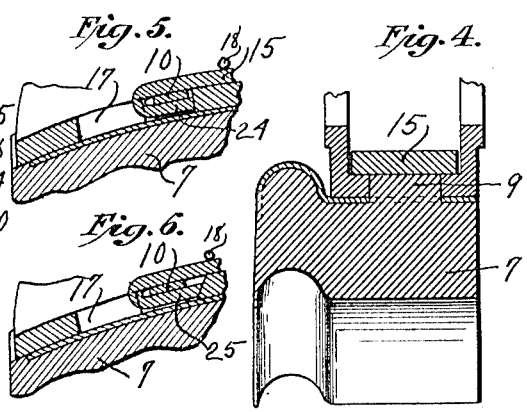
Attest:
Inventor:
Joseph D. Gallagher
by George Cook
Atty

UNITED STATES PATENT OFFICE.

JOSEPH D. GALLAGHER, OF GLEN RIDGE, NEW JERSEY, ASSIGNOR TO AMERICAN BRAKE SHOE & FOUNDRY COMPANY, OF MAHWAH, NEW JERSEY, A CORPORATION OF NEW JERSEY.

BRAKE-SHOE AND SUPPORTING MEANS THEREFOR.

1,079,001.  Specification of Letters Patent.  Patented Nov. 18, 1913.

Application filed March 24, 1913. Serial No. 756,306.

*To all whom it may concern:*

Be it known that I, JOSEPH D. GALLAGHER, a citizen of the United States, and a resident of Glen Ridge, in the county of Essex and State of New Jersey, have made and invented certain new and useful Improvements in Brake-Shoes and Supporting Means Therefor, of which the following is a specification.

My invention relates to brake heads for supporting brake shoes in position adjacent the periphery of the wheel of a locomotive, car, or other railway vehicle, and to brake shoes designed for use with the head.

The object of my invention is to provide a brake head and shoe designed for use in positions where the extent of movement of the brake shoe away from the periphery of the wheel is limited, this end being accomplished by providing a brake head and shoe in which the attaching lug, by means of which the shoe is secured to and supported from the head by a suitable key, as will be understood, may be made of minimum height, or at least much shorter than is at present commonly the case, and by providing a brake shoe in which the two end stops or lugs commonly present in brake shoes are replaced by a single thrust absorbing lug which may be of less height than the end stops.

In replacing a worn shoe with a new one in accordance with the present practice the head must be moved away from the periphery of the wheel a distance sufficient to permit a new shoe to be placed in position between the head and the wheel, which distance is obviously at least equal to the thickness of the new shoe plus the height of the projecting attaching lug, or plus the height of the thrust absorbing lug of the shoe; hence any scheme whereby a brake shoe may be employed having an attaching lug, or thrust absorbing lug, of less height than is usually the case, reduces the distance that the head must be moved away from the tread surface of the wheel in order to permit a new brake shoe to be moved into position between the head and flange of the wheel and secured in place to the brake head. This feature is of particular importance in the case of shoes designed for use upon the driving wheels of a locomotive, as, in such cases, the permissible movement of the head away from the periphery of the wheel is often extremely limited in amount, and limited to such a degree that the head could not be moved away from the periphery of the driving wheel a distance sufficient to permit a brake shoe having an attaching lug or a thrust absorbing lug of the usual height to be used.

With these and other ends in view, my invention consists in the improved brake head hereinafter more specifically referred to and claimed; in the improved brake shoe designed for use with the head; and in the combination of said elements; all as hereinafter described and claimed and illustrated in the accompanying drawing wherein the preferred embodiment of my invention is illustrated.

In the drawings: Figure 1 is a view showing my improved brake head and brake shoe in side elevation, portions of the head being broken away in order to show features of internal construction; Fig. 2 is a view showing a section upon a curved surface indicated by the line 2—2, Fig. 1 looking up; Fig. 3 is a view showing a section taken upon a transverse plane indicated by the line 3—3, Fig. 1; Fig. 4 is a view similar to Fig. 3 but taken upon a plane indicated by the line 4—4, Fig. 1; and Figs. 5 and 6 are fragmentary views illustrating a modified form of certain features of my invention.

In the drawings, the reference character 7 designates a brake shoe having a curved surface adapted to contact with the periphery of a car wheel, as will be understood, and the rear portion or back of which is adapted to contact with a brake head 8 carried by a brake beam and operated by any suitable mechanism. The brake shoe is provided with a thrust absorbing lug 9 the location of which is preferably central with reference to the shoe, which lug prevents the shoe from moving longitudinally or in a direction in which the periphery of the wheel is rotating. The shoe is also provided with one or more attaching lugs 10 by means of which the same is secured to the brake head 8 and held in place thereupon. The brake shoe illustrated in the drawing is of the type commonly designated as a flanged shoe and is shown as having a steel plate or back embedded in its rear face, although it will be understood that the particular type of brake shoe referred to is in no way involved in my invention and that a brake shoe having a bearing surface of any particular form may be used.

In the drawings the brake head is shown as having two side flanges 12 and a bottom portion 13 connecting said side flanges to thereby provide a large area of contact between the head and the back of the shoe, although the extent of said area of contact is of secondary importance and varies within wide limits in different types of shoe and head, and in accordance with various practices obtaining among users of brake shoes in specific instances, depending generally upon the service to which the shoe is to be put.

The bottom portion 13 above referred to is provided with a recess 11 into which the thrust-absorbing lug 9 of the shoe enters to thereby prevent the shoe from moving longitudinally of the head and in the direction of movement of the periphery of the wheel, and with one or more openings 14 into which the attaching lugs 10 extend, and the number of which latter openings obviously corresponds with the number of attaching lugs of the shoe.

The reference character 15 designates a securing key carried by the brake head and by means of which the brake shoe is held in place thereupon, and which key is provided with one or more lug engaging portions or elements 16, the number thereof corresponding with the number of attaching lugs provided upon the shoe, which lug engaging elements are offset with reference to the main body portion of the key; or, as otherwise expressed, said lug engaging elements are located beneath or below the main body portion of the key. These terms of direction, however, are used for the purpose of convenience and in connection with the accompanying drawing, and are intended to include constructions of the securing key in which the lug engaging element thereof is located between the key proper or body portion and the brake shoe to thereby bring the element of the key which engages the attaching lug of the shoe into the immediate vicinity of the rear portion or back of the shoe and thus permit the use of a comparatively short attaching lug, whereby the shoe may be manipulated in less space than is at present commonly the case, as above explained.

The key 15 is, in the embodiment of my invention illustrated, located between the side flanges 12 of the brake head, and is shown as resting upon the inner surface of the lower connecting bottom portion 13 of said head. The lug engaging elements 16 of the key extend into the opening 14, and into the openings in the key lugs, as best shown in Fig. 1, when the shoe is secured in position upon the head; said openings being shown as provided with extensions 17 somewhat narrower than the openings 14 and which extensions obviously permit longitudinal movement of the key 15 with reference to the brake head and brake shoe, during which movement the lug engaging elements 16 enter the narrow extension 17; it being obvious that the shoe is secured in place upon the head by a longitudinal movement of the key in one direction, and disengaged from the lower by the corresponding movement of the key in a reverse direction.

The key 15 is preferably permanently secured in place within the brake head as by means of a transverse guide or rod 18 and an extending portion 19 which passes through an end wall 20 of the brake head. The key is also preferably provided with an opening 21 adjacent one end of the extension 19 through which a transverse key 22 may extend, to thereby hold the key 15 in proper position with the lug engaging elements 16 thereof within the openings of the attaching lugs of the shoe, and prevent the shoe from becoming accidentally disengaged from the head.

The lug engaging elements 16 are shown as formed by narrowing the end of the key 15 and bending the narrowed portion over until it occupies a position adjacent the under side of the key, and by cutting a portion of the key free along three sides and depressing the portion thus cut free, the key being commonly made from a wrought iron or mild steel plate. It is generally desirable that the free ends of these lug engaging elements be supported by the brake head when a shoe is secured in place thereupon, as a stronger construction is thereby procured, to which end the ends of said elements are rabbeted as shown in Fig. 1, and engage the ledge 23 formed in the bottom portion 13 of the brake head. In the form shown in Fig. 5 the free end of the lug engaging element 24 is unsupported, while in the form shown in Fig. 6 the free end of the lug engaging element 25 is inclined and engages a corresponding inclined wall of the transverse bottom of the head.

In view of the premises it will be understood that the brake head need be moved away from the periphery of the wheel a much less distance in order to replace a worn shoe by a new one than would be the case if the attaching lug of the shoe was of such a length as to extend through the bottom 13 a distance sufficient to receive a securing key resting upon the inner surface of the bottom, as is usually the case; and that if the head be moved away from the wheel a distance sufficient merely to clear the thrust absorbing lug 9 and the attaching lugs 10 of a shoe, the same may be placed upon the tread of the wheel and brought into position by movement in the direction of its length. It will also be understood that movement of the brake shoe in the direction in which the periphery of the wheel is moved is prevented by the thrust absorbing lug 9 located intermediate the ends of the shoe, and not by stops located at the ends of the shoe as is usually the case. This is a feature of advantage, especially in cases where the shoe has to be manipulated in a limited space, as, in such cases, the end stops or lugs heretofore commonly used frequently interfere with the brake head and render it difficult if not impossible to place the shoe in position. Also, and because of the fact that in my device the extent of movement of the securing key longitudinally of the brake head necessary in order to release a brake shoe, or to secure it to the head after it has been placed in proper position, is merely such as will move the lug engaging elements of the key out of or into the opening in the attaching lug of the shoe, it follows that my device may be used in positions where there is not sufficient room (because of the end of the key coming into contact with some other member) to withdraw the ordinary key entirely from the attaching lug of the shoe, as by moving it a distance equal to at least one-half its length, as is necessary with the forms of securing key in ordinary use for securing the shoe to the head. This feature is of particular importance in case a brake shoe having two or more attaching lugs is used, as, in such a case and when the usual single key of a length corresponding approximately with the length of the brake head and passing through all the lugs of the shoe is employed, the key has to be moved a distance corresponding approximately with its length in order to release the shoe from the head. Finally, the securing key in the preferred form of my device being located within the brake head and permanently secured in place therein, it will not become displaced or separated from the head during the operation of removing a worn shoe and substituting an unworn shoe therefor; and, the securing key being operable from the end of the brake head, it is not necessary to work within the limited space within the head in removing or replacing a shoe, which is a feature of especial importance in cases where a shoe having two or more attaching lugs and a corresponding number of separate securing keys are used, as is at present commonly the case.

Having thus described and explained my invention, I claim and desire to secure by Letters Patent:

1. The combination with a brake head having a surface adapted to contact with the back of a brake shoe, and a recess adapted to receive a thrust absorbing lug of a shoe; of a securing key having a lug engaging element adapted to engage the attaching lug of a brake shoe.

2. The combination with a brake head adapted to support a brake shoe and having a portion which contacts with the back of a shoe when the same is supported by said head, and a recess adapted to receive a thrust absorbing lug of a shoe; of a securing key having a lug engaging element located beneath the main body of the key and adapted to engage the attaching lug of the shoe.

3. The combination with a brake head adapted to support a brake shoe and having a portion which contacts with the back of a shoe when the same is supported by said head, and a centrally located recess adapted to receive a lug of a shoe; of a securing key carried by said head and having two lug engaging elements located one upon each side of said recess and between the main body of the key and the back of a shoe supported by said head, and which lug engaging elements are adapted to engage two attaching lugs of a brake shoe.

4. The combination with a brake head having two side flanges and a bottom portion connecting said flanges and adapted to contact with the back of a brake shoe, and which bottom portion is provided with a recess adapted to receive a thrust absorbing lug of a brake shoe and with an opening into which an attaching lug of a brake shoe may extend; of a securing key located between said side flanges and provided with a lug engaging element extending into the opening aforesaid and adapted to engage the attaching lug of a brake shoe.

5. The combination with a brake head having two side flanges and a bottom portion connecting said flanges and adapted to contact with the back of a brake shoe, and which bottom portion is provided with a recess adapted to receive a thrust absorbing lug of a brake shoe and with an opening into which an attaching lug of a brake shoe may extend; of a securing key located between said side flanges and provided with a lug engaging element located within the opening aforesaid and movable into and out of engagement with the attaching lug of a brake shoe.

6. The combination with a brake head having two side flanges and a bottom portion connecting said flanges and adapted to contact with the back of a brake shoe, and which bottom portion is provided with a centrally located recess adapted to receive a thrust absorbing lug of a shoe and with two openings located one upon each side of said recess and into which two attaching lugs of a brake shoe may extend; of a securing key located between said side flanges and resting upon said body portion and movable longitudinally of said head, and which key is provided with two lug engaging elements located within the openings aforesaid and adapted to engage two attaching lugs of a brake shoe.

7. A brake shoe having key attaching lugs on the back thereof, and an imperforate lug between said key attaching lugs, the arrangement of said attaching lugs being such that they may be engaged by a single securing key.

8. A brake shoe having formed on the back thereof two perforated key attaching lugs, and an intermediate imperforate lug, the perforations in said attaching lugs extending transverse to the shoe so that a securing key may be moved longitudinally of the shoe and made to engage said attaching lugs.

9. A brake shoe having a centrally arranged thrust absorbing lug, and two attaching lugs located one upon each side of said thrust absorbing lug and by which the shoe may be attached to a brake head, the arrangement of said attaching lugs being such that they may be engaged by a single securing key.

10. A brake shoe having an imperforate thrust absorbing lug intermediate its ends, and an attaching lug provided with an opening therein whereby the shoe may be secured to a brake head, said opening extending transverse to the shoe so that a securing key may be moved longitudinally of the shoe and made to engage said attaching lug.

11. A brake shoe having an imperforate centrally arranged thrust absorbing lug, and two attaching lugs located one upon each side of said thrust absorbing lug and provided each with an opening therethrough and which openings extend transverse to the shoe whereby the shoe may be attached to a brake head by a securing key movable longitudinally of the shoe.

12. In combination, a brake shoe having a thrust absorbing lug intermediate its ends, and an attaching lug; a brake head having a surface adapted to contact with the back of said shoe, and a recess adapted to receive said thrust absorbing lug; and a securing key carried by said head and having a lug engaging element offset toward the contacting surface aforesaid and adapted to engage said attaching lug.

13. In combination, a brake shoe having a thrust absorbing lug intermediate its ends, and an attaching lug; a brake head having a surface adapted to contact with the back of said shoe, and a recess adapted to receive said thrust absorbing lug; and a securing key carried by said head and having a lug engaging element located beneath the main body of the key and adapted to engage said attaching lug.

14. In combination, a brake shoe having a thrust absorbing lug intermediate its ends, and an attaching lug; a brake head having two side flanges and a bottom portion connecting said flanges and adapted to contact with the back of said shoe, and which bottom portion is provided with a recess adapted to receive said thrust absorbing lug and with an opening adapted to receive said attaching lug; and a securing key located between said side flanges and having a lug engaging element extending into the opening provided for said attaching lug and adapted to engage the same.

15. In combination, a brake shoe having a thrust absorbing lug intermediate its ends, and an attaching lug; a brake head having two side flanges and a bottom portion connecting said flanges and adapted to contact with the back of said shoe, and which bottom portion is provided with a recess adapted to receive said thrust absorbing lug and with an opening adapted to receive said attaching lug; and a securing key located between said side flanges and having a lug engaging element located within the opening provided for said attaching lug and movable into and out of engagement with said lug.

16. In combination, a brake shoe having a central thrust absorbing lug, and two attaching lugs located one at each side of said central lug; a brake head having two side flanges and a bottom portion connecting said flanges and adapted to contact with the back of said shoe, and which bottom portion is provided with a recess adapted to receive said thrust absorbing lug and with openings adapted to receive said attaching lugs; and a securing key located between said side flanges and resting upon said bottom portion and movable longitudinally of the shoe, and which key is provided with lug engaging elements located within the openings provided for said attaching lugs and movable into and out of engagement with said lugs.

17. The combination with a brake head having a face adapted to contact with the back of the shoe and which face is provided with a recess for receiving a thrust-absorbing lug on the back of a brake shoe; of a brake shoe provided on its back with an imperforate lug adapted to enter the recess aforesaid, and with an attaching lug; and means movable longitudinally of the shoe and adapted to engage said attaching lug for securing said shoe to said head.

18. The combination with a brake head provided at about the center of its length with a recess, of a brake shoe provided with a centrally arranged imperforate thrust-receiving lug, and attaching lugs located one upon each side of said central lug; and means movable longitudinally of the shoe and adapted to engage said attaching lugs for securing said head and shoe together.

Signed at New York, borough of Manhattan, in the county of New York, and State of New York, this 20″ day of March A. D. 1913.

JOSEPH D. GALLAGHER.

Witnesses:
A. V. WALSH,
R. N. FLINT.

Copies of this patent may be obtained for five cents each, by addressing the "Commissioner of Patents, Washington, D. C."